M. B. MORGAN, W. D. COLLINS AND G. T. KINNEY.
MEANS FOR DUST PROOFING ROTATING GEAR CASES.
APPLICATION FILED APR. 21, 1919.

1,338,032.　　　　　　　　　　　　　　Patented Apr. 27, 1920.

UNITED STATES PATENT OFFICE.

MATHEW B. MORGAN, OF CLEVELAND HEIGHTS, WILLIAM D. COLLINS, OF EAST CLEVELAND, AND GRAYSON T. KINNEY, OF CLEVELAND, OHIO, ASSIGNORS TO THE CLEVELAND TRACTOR COMPANY, OF EUCLID, OHIO, A CORPORATION OF OHIO.

MEANS FOR DUST-PROOFING ROTATING GEAR-CASES.

1,338,032.      Specification of Letters Patent.      Patented Apr. 27, 1920.

Application filed April 21, 1919. Serial No. 291,530.

*To all whom it may concern:*

Be it known that we, MATHEW B. MORGAN, WILLIAM D. COLLINS, and GRAYSON T. KINNEY, citizens of the United States, and residents, respectively, of Cleveland Heights, Cuyahoga county, Ohio, East Cleveland, Cuyahoga county, Ohio, and Cleveland, Cuyahoga county, Ohio, have invented a certain new and useful Improvement in Means for Dust-Proofing Rotating Gear-Cases, of which the following is a full, clear, and exact description.

In certain kinds of motor vehicles, as for example, trucks and tractors, the driving wheels are hollow and contain an internal ring gear; and each of said wheels is rotated by a pinion which engages said ring gear; and is fixed to a shaft that is in turn mounted in bearings carried by the main frame of the vehicle.

In such constructions it is common to employ a nonrotating disk nicely fitted into the open side of the wheel for the purpose of closing the chamber within the wheel and thereby creating a closed gear case therein.

The object of this invention is to make such a joint between the rotating wheel and the nonrotating disk as will effectually exclude dust, mud, water and the like, and will prevent the escape of oil from said gear case.

The invention consists in the construction and combination of parts shown in the drawing and hereinafter described and pointed out definitely in the appended claims.

In the drawings, Figure 1 is a central sectional view of somewhat more than one half of a wheel to which this invention is applied; Fig. 2 is an elevation partly broken away and sectioned showing, from the innerside, a part of said wheel and associated parts; and Fig. 3 is an enlarged radial section of the rim of said wheel and associated parts. Fig. 4 is a detail section of lugs 54 and 44.

The invention is exemplified in connection with the driving sprocket wheel of a track laying tractor of the type which is disclosed in our prior Patent No. 1,275,344; but obviously the invention is not limited to this particular use.

The wheel 10 as shown is formed with a hub 12, a cylindrical rim flange 14, and an outside plate which connects the hub and rim and is integral with both, and furnishes the outside wall of the gear case within the wheel. The hub 12 is rotatably mounted upon a nonrotating axle 20 secured to a bracket 21 which, it will be understood, is fixed to the main frame of the vehicle.

An internal ring gear 25 is fitted within the cylindrical flange 14 of the wheel and is there secured. A pinion 30 located within the wheel meshes with this ring gear and is fixed to a rotating driving shaft 31 which is rotatably mounted in bearings in a bracket 32, which is also secured in the fixed frame work of the machine. A circular disk 40 which may be made of thin sheet metal is fixed to the end of bracket 32 within the wheel flange 14.

To the extent above described the construction as shown is substantially like that which is shown in the above mentioned prior patent. The means for making a dust and water tight joint between the wheel and its supporting bearing, and between the inner periphery of the disk 40 and the part, surrounding the axle 20, with which said disk engages, may likewise be as shown in said prior patent, or may have any other suitable construction. This is not material to the present invention.

A packing holding ring 50, which may be made of sheet metal, is fitted within the cylindrical flange 14 of the wheel. Its outer edge is turned over in the form of a cylindrical flange 51 which has a nice sliding fit within said cylindrical flange. This ring at its inner periphery is provided with a cylindrical flange 52 which extends toward but does not touch the disk 40. In the annular space between the cylindrical flange 14 of the wheel and the cylindrical flange 52 of this packing holding ring and between the packing holding ring and the disk 40, a packing ring 60, preferably made of felt, is fitted. By thrusting the packing holding ring toward disk 40 this packing will be pressed tightly against the face of the disk 40 and will likewise be so compressed and deformed that it will press tightly against the inner wall of the cylindrical flange 14 of the wheel. Numerous coil springs 28 are compressed between a part rigid with the wheel and the packing holding ring 50, and these act to thrust the packing holding ring toward the disk 40 with the result stated. These springs are held in place because they embrace the heads 26 of the bolts 27 that fasten the ring gear to the wheel.

It is desirable that this packing holding ring 50 and the packing 60 shall rotate with the wheel; and to bring about this result a thin metal ring 43 is fastened against the outer face of the ring gear by these same bolts 27. Tongues 44 are pressed out of said ring at intervals toward the ring 50; and the other tongues 54 are pressed out of the ring 50 toward the ring 43. These tongues overlap and engage so as to form driving connections between the wheel and the packing supporting ring. Therefore as the wheel rotates the packing will rotate with it but will slide against the inner face of disk 40 and will maintain a broad, dust and water tight engagement therewith.

The described construction prevents the escape of oil from, and the entry of dust, dirt and water into the gear case between the periphery of the disk 40 and the flange 14.

At the outer periphery of the disk 40 is a flange 41 which lies within the wheel flange but extends away from the wheel, and at an angle toward the axis of the wheel. This flange is cut away at intervals whereby what remains forms separated teeth 42. As the wheel turns relatively these teeth act to cut and clear away the mud or dirt which may find lodgment within the flange 14.

Having described our invention, we claim:—

1. The combination of a rotatable hollow wheel having a concentric cylindrical flange, an internal ring gear fitted and secured within said flange, a fixed bracket adjacent the open end of said flange, and a disk fitted to said bracket within said flange, with a packing holding ring fitted within said flange having at its inner periphery a flange which extends toward said disk, a ring of packing material between said disk and said packing holding ring and between the flange of the latter and the flange of the wheel, and springs located between said packing holding ring and a part of the wheel, acting to press said ring toward the disk.

2. The combination of a rotatable hollow wheel having a concentric cylindrical flange, an internal ring gear fitted and secured within said flange, a fixed bracket adjacent the open end of said flange, and a disk fitted to said bracket within said flange, with a packing holding ring fitted within said flange having at its inner periphery a flange which extends toward said disk, a ring of packing material between said disk and said packing holding ring and between the flange of the latter and the flange of the wheel, springs located between said packing holding ring and a part of the wheel, acting to press said ring toward the disk, and means compelling said packing holding ring to rotate in unison with the wheel.

3. The combination of a rotatable hollow wheel having a concentric cylindrical flange, an internal ring gear fitted within said flange, a thin metal ring engaging the outer face of said ring gear, bolts connecting said ring and ring gear to said wheel, a fixed bracket adjacent the open end of said wheel flange, a disk fitted to said bracket within said wheel flange, a packing holding ring fitted within said wheel flange having at its inner periphery a flange which extends toward said disk, the said packing holding ring and the ring which is secured to the ring gear being provided with overlapping and engaging tongues, a ring of packing material between said disk and packing ring and between the flange of the latter and the flange of the wheel, and coil springs which surround the heads of said bolts and are located between the packing holding ring and said ring gear and which act to press the packing holding ring toward the disk.

4. The combination of a rotatable hollow wheel having a concentric cylindrical flange, an internal ring gear fitted and secured within said flange, a fixed bracket adjacent the open end of said flange, and a disk fixed to said bracket within said flange, with a packing holding ring fitted within said flange having at its margin a cylindrical flange which extends toward said disk, a ring of packing material between said disk and said packing holding ring and between the flange of the latter and the flange of the wheel, springs located between said packing holding ring and a part of the wheel, acting to press said ring toward the disk, said disk having at its marginal edge an outwardly extended inclined flange, which is cut away at intervals whereby the intermediate parts form clearance teeth.

In testimony whereof, we hereunto affix our signatures.

MATHEW B. MORGAN,
WILLIAM D. COLLINS.
GRAYSON T. KINNEY.